Jan. 14, 1941.　　　M. R. MULLEN　　　2,228,776

PROPELLER

Filed May 3, 1938

Inventor:
Milton R. Mullen,
By Z. T. Wolensmith 2nd
Attorney.

Patented Jan. 14, 1941

2,228,776

UNITED STATES PATENT OFFICE 2,228,776

PROPELLER

Milton R. Mullen, Philadelphia, Pa.

Application May 3, 1938, Serial No. 205,839

3 Claims. (Cl. 170—163)

This invention relates to propellers and more particularly to a propeller for aircraft and the like, the pitch of which may be varied or controlled in accordance with the operating conditions.

It is an object of the present invention to provide a system for varying the pitch of the propeller which permits of a wide variation in adjustment of the pitch of the propeller.

It is a further object of the invention to provide a system for varying the pitch of a propeller which may be operated automatically at constant speed.

It is a further object of the present invention to provide a system for controlling the variation of pitch of a propeller embodying the control by a speed responsive governor.

It is a further object of the present invention to provide a controllable pitch propeller which may be adjusted so that the power of the engine is used to produce a propelling effect or a braking effect as desired.

It is a further object of the present invention to provide a controllable pitch propeller which may be shifted as desired to a full feathering position.

It is a further object of the present invention to provide a controllable pitch propeller which may be fully and safely controlled over a wider range of movement than has heretofore been attained.

It is a further object of the present invention to provide a controllable pitch propeller which is provided with a "reverse" as well as a forward control.

Further objects of the invention will appear in the annexed specification and claims.

The nature and characteristic features of the present invention will be more readily understood from the following description taken in connection with the accompanying drawing forming part hereof, in which.

Figure 1:
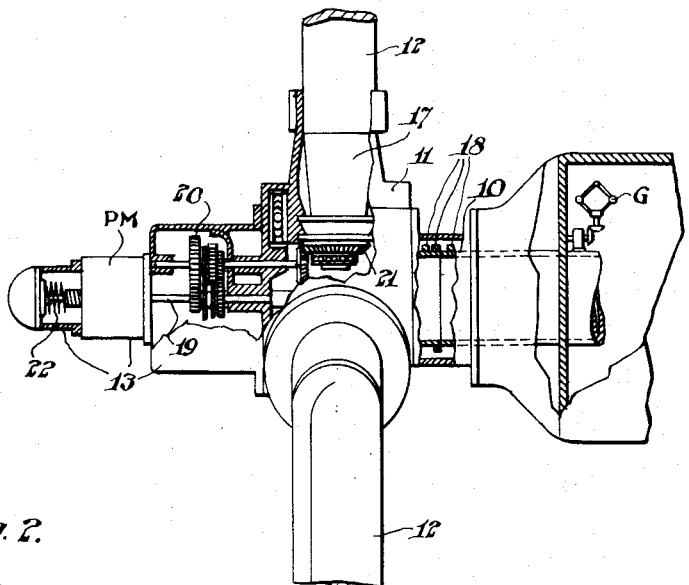
Figure 1 is a fragmentary partial sectional view of the propeller and certain features of the control mechanism therefor.

It will, of course, be understood that the description and drawing herein contained are illustrative merely, and that various changes and modifications may be made in the structure disclosed without departing from the spirit of the invention.

Referring more particularly to the drawing, the propeller shaft 10 which is driven by an engine (not shown) has a hub 11 mounted thereon and movable therewith within which the blades 12 of the propeller are carried. The blades 12 may be mounted in the hub 11 in any desired manner and are suitably journaled for rotation to shift the position of the leading edge of the blade 12 and change the pitch of the propeller, as hereinafter more fully referred to.

The system of the present invention has portions thereof preferably carried on a fixed portion of the plane adjacent the propeller shaft 10 and portions movable with the hub 11 and carried in part within a housing 13 secured to the hub 11. A governor G driven by the propeller shaft 10 in any suitable manner, suitable switches MS and FS, and a suitable source of electrical energy with power leads 15 and 16, are preferably carried on a fixed portion of the plane.

The portion of the system movable with the hub 11 preferably includes a pitch adjusting and controlling motor PM having an armature MA and oppositely wound fields FF and RF for effecting rotation of the armature MA in the desired direction, and a control sleeve C which may be mounted on the propeller blade at 17.

Suitable circuit connections are also provided, as hereinafter pointed out, and slip rings or brush commutators 18 are employed for continuing the circuit connections from the fixed portions to the movable portions of the structure.

The pitch adjusting and controlling motor PM is mounted within the housing 13 and the shaft 19 thereof is connected by suitable gears 20 to a gear 21 which is provided on the inner portion of each of the blades 12, so that a simultaneous change of the pitch of each blade may be effected.

Figure 2:
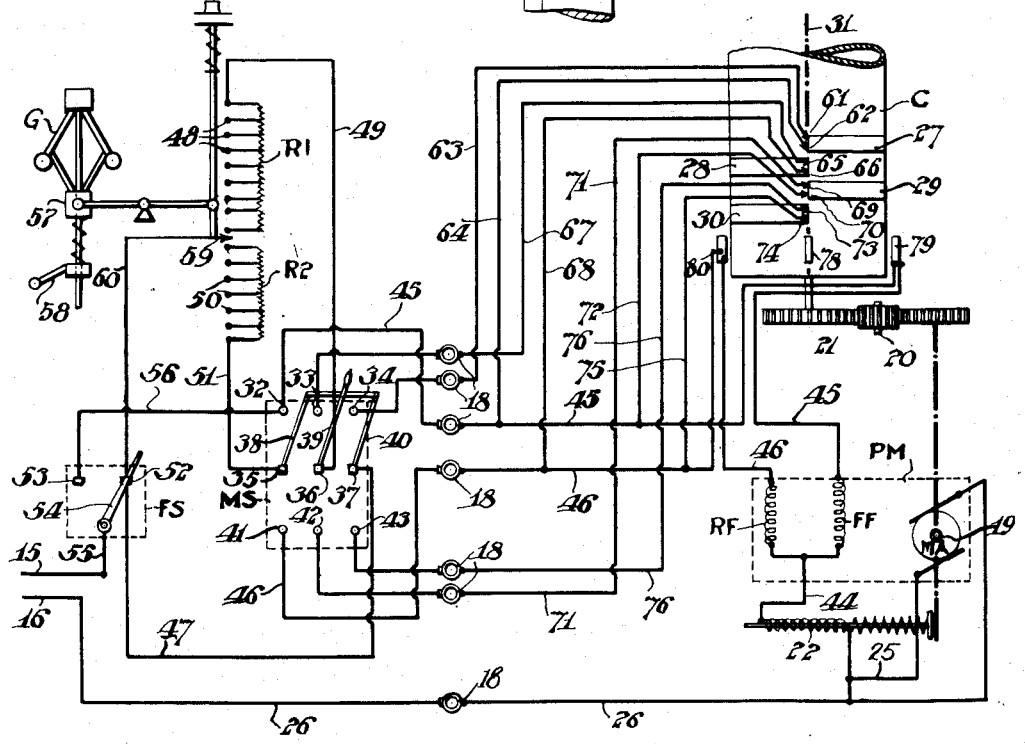
Fig. 2 is a diagrammatic view of the system showing the electrical circuit connections employed with the structure shown in Fig. 1.

The motor PM, as illustrated in Fig. 2, has the armature MA, and the field windings FF and RF for forward operation of the armature MA and for reverse operation of the armature MA in accordance with the energization of the proper field winding.

A spring loaded magnetic brake 22 is connected in the circuit which includes windings FF and RF, as hereinafter more fully referred to, for holding the armature MA in fixed position when the field windings are deenergized.

The armature MA is supplied with electrical energy in series with the field coils FF and RF from the power lead 15 by a conductor 44 and a conductor 25 to which extends a suitable brush in contact with the armature MA and from the power lead 16 by a conductor 26 which extends to another brush in contact with the armature MA.

The control sleeve C is provided preferably on one of the propeller blades 12 within the hub 11 at 17 and includes an insulated portion having suitable conducting strips 27, 28, 29 and 30 mounted therein and suitably insulated one from the other, the dot and dash line 31 indicating the leading edge of the blade on which the same is mounted. Suitable provision may be made on the other blades for duplicating this structure on each of the blades if desired and to reduce the likelihood of operating failures, and other provisions may be made for preventing a condition of static and dynamic unbalance of the propeller assembly.

The control switch MS is shown as a three-pole double throw switch, although of course any other suitable switching mechanism for effecting the same purposes may be substituted therefor as desired. The switch MS includes three forward contact elements at 32, 33 and 34, respectively; three intermediate contacts 35, 36 and 37 to which the knives 38, 39 and 40 of the switch MS are respectively connected; and three reverse contacts at 41, 42 and 43, respectively. The contact element 32 of the switch MS is connected to the field winding FF by a suitable conductor 45 and the contact element 41 is preferably connected to the field winding RF by a suitable conductor 46. The field windings FF and RF are connected together and to the conductor 26 by a conductor 44 and coil 22.

A resistor R1, having a plurality of contact points 48 connected thereto is provided and is connected by a conductor 49 to the contact element 36 of the switch MS. A resistor R2 having a plurality of taps 50 therealong is also provided, the resistor R2 being connected by a suitable conductor 51 to the contact element 35 of the switch MS.

The feathering control switch FS has a contact element 52 utilized for normal operation of the system, and a contact point 53 for providing, under certain conditions as hereinafter pointed out, a full feathering position of the propeller blades 12. The feathering control switch FS has a suitable switch arm 54 which is connected by a suitable conductor 55 to the power lead 15. The contact element 53 of the switch FS is connected by a conductor 56 to the contact element 32 of the switch MS. A conductor 57 is also provided between the contact element 52 of the switch FS and the contact element 37 of the switch MS.

The governor G may be of any desired type but includes a movable portion as at 57 which changes its position in accordance with the change of speed above or below a selected level and provisions for changing the speed level as at 58. The governor G, for any particular setting of speed level controls the positioning of a movable contact member 59 which is connected by a conductor 60 to the contact element 52. The movable contact member 59 is adapted to contact one of the contact points 48 of the resistor R1 or one of the contact points 50 of the resistor R2 in accordance with the operation of the governor G, as hereinafter more fully pointed out.

A plurality of contact members are provided for contact with the conducting strips of the control sleeve C. As indicated in Fig. 2 of the drawing, two conducting strips 29 and 30 extend in one direction from the line 31 (illustrated as to the left in Fig. 2) and two other contact strips 27 and 28 extend in the opposite direction from the same line 31 (illustrated as to the right in Fig. 2). The contact strips 27, 28, 29 and 30 preferably each extend through an arc of approximately 85 to 90°. The contact strip 27 has two contact members 61 and 62 for contact therewith, the contact member 61 being connected to the contact element 34 of the switch MS by a suitable conductor 63 and the contact member 62 being connected by a suitable conductor 64 to the conductor 45.

The contact strip 28 has two contact members 65 and 66 for contact therewith under certain conditions, the contact member 65 being connected by a suitable conductor 67 to the contact element 33 of the switch MS and the contact member 66 being connected by a suitable conductor 68 to the conductor 46.

The contact strip 29 has two contact members 69 and 70 for contact therewith under certain conditions of operation, the contact member 69 being connected by a suitable conductor 71 to the contact element 42 of the switch MS and the other contact member 70 being connected by a conductor 72 to the conductor 45.

The contact strip 30 has two contact members 73 and 74 for contact therewith under certain conditions of operation, the contact member 74 being connected by a suitable conductor 75 to the conductor 46 and the other contact member 73 being connected by a suitable conductor 76 to the contact element 43 of the switch MS.

The control sleeve C may also be provided with a stop or cutout pin 78 projecting therefrom, and a cutout contact mechanism 79 operable for breaking the circuit upon contact therewith of the stop 78 may be interposed in the conductor 45 leading to the winding FF and another cutout contact mechanism 80 for breaking the circuit upon contact of the stop 78 interposed in the conductor 46 leading to the winding RF.

The mode of operation of the system of the present invention will now be pointed out. In the normal forward operation of the airplane the leading edges of each blade of the propeller are disposed in planes which are at angles forwardly inclined with respect to a plane passing through the respective longitudinal axes of the propeller blades. With a variable pitch propeller the angles or pitch may be varied as desired. For constant speed engine operation the pitch is varied in accordance with the load on the engine so that as the load is increased, with a resultant tendency to reduce the engine speed, the pitch angle is decreased to an extent such that the load will be decreased and the engine speed will be or remain constant. Similarly, if the load on the engine is decreased the pitch angle is increased to an extent such that the load will be increased and the engine speed will be or remain constant.

In addition to providing for and effecting a pitch variation as heretofore referred to, the system of the present invention provides for control and variation of the pitch with a rearward disposition of the leading edges of the propeller blades for use in braking, or in rapid turning where a plurality of engines are used on the plane.

The manner in which this is effected will now be referred to.

When it is desired to maintain the proper pitch of the propeller for constant speed operation of the engine for driving the propeller, the switch FS is set with the arm 54 in contact with the contact member 52, the governor G is set for the desired speed, and the switch MS is set with the arms 38, 39 and 40 thereof in contact respectively with the contact elements 32, 33 and 34. Certain control circuits are set up with these conditions. In order to fulfill the circuit characteristics previously described all circuits are completed only during desired times by the switch MS and in some instances the parts of the sleeve C. For example, when the leading edge of the propeller blade is in the reverse quadrant and normal forward operation is desired, current is fed from the switch MS independent of the governor and dependent only upon the leading edge position so that, regardless of engine speed, the blade is immediately swung to the forward quadrant. The foregoing circuit is complete through contact strip 27 and contact members 61 and 62, conductor 64, conductor 45, circuit interrupter 79, conductor 46, field FF only when the leading edge is in the reverse quadrant and switch MS is in forward position. As the leading edge 31 passes zero and goes into the forward quadrant, contact strip 27 ceases to be in contact with contact members 61 and 62 and the governor shunting circuit to forward field FF is interrupted.

Similarly, when switch MS is set for reverse quadrant operation, with knives 38, 39 and 40 respectively connected to reverse contacts 41, 42 and 43, forward field FF may receive current only while the leading edge 31 of the blade 12 as indicated in Figure 2 at sleeve C, is in the reverse quadrant and contact strip 29 is completing the circuit thru contact members 69 and 70. Thus any circuits that would cause movement of the leading edge of the blade to forward of zero pitch are opened at zero pitch when the master switch MS is set for reverse quadrant operation.

Contact strip 30 can complete the governor shunting reverse field RF circuit only when the leading edge 31 is forward of zero and the switch MS is set for reverse quadrant operation in which case current is supplied directly to the reverse field RF.

In order to avoid any possibility of the leading edge of the blade entering the reverse quadrant during forward quadrant operation, the circuit between the switch MS and the field RF can be completed only when the leading edge is forward. This is accomplished by routing the circuit through contacts dependent upon the leading edge position and operated in relation thereto. Thus contact strip 28 completes the reverse field RF circuit through contact members 65 and 66 only when it and the leading edge come forward of line 31 which is here shown at the position of zero pitch.

Should the leading edge be in the reverse quadrant when switch MS is thrown to forward operating position there can be no current flow to field RF as contact strip 28 is not in position to complete the circuit through contact members 65 and 66. There is, however, a circuit completed between the power lead 15 and the forward field FF, both through the governor controlled circuit of switch MS contact element 32, conductor 45, etc., and through the governor shunting circuit of switch MS contact element 34, conductor 63, contact member 61, contact strip 27, contact member 62, conductor 64, conductor 45, through circuit interrupter 79, conductor 79, forward field FF, etc., until the leading edge reaches zero whereupon contact strip 27 no longer is in position to contact the members 61 and 62 nor to thereby complete the governor shunting circuit.

Energy is supplied to the armature MA of the motor PM in series with the field coils FF and RF through the conductor 25, the motor armature MA, and the conductor 26 to the power lead 16.

For forward operation alternative circuits are provided in accordance with the relation of the speed of the propeller shaft 10, as indicated by the governor G, to the predetermined constant speed. If the load on the propeller increases, so that there is a tendency of the engine which drives the propeller to slow down, the slowing of the shaft 10 through its effect on the governor G moves the movable contact member 59 into contact with one of the contact points 48 of the resistor R1 and a circuit is set up as follows: from the power lead 15 through the conductor 55, switch arm 54, conductor 60, movable contact member 59, resistor R1, conductor 49, switch arm 39, conductor 67, contact member 65, contact strip 28, contact member 66, conductor 68, conductor 46, field RF, conductor 44 and conductor 25, armature MA and conductor 26 to power lead 16.

On energization of the field RF there is a rotation of the armature MA and this motion is transmitted through the gearing 20, 21 to the propeller blades 12 to shift the blades in such a manner that the leading edge of the propeller is brought to a position closer to the vertical plane extending through the respective longitudinal axes of the several blades.

If, on the other hand, the load on the propeller is reduced so that the engine driving the propeller shaft 10 tends to speed up, the increase is indicated by the governor G which moves the movable contact member 59 into contact with one of the contact points 50 of the resistor R2, and a circuit is set up as follows: power lead 15, conductor 55, switch arm 54, conductor 60, movable contact 59, resistor R2, conductor 51, switch arm 38, conductor 45, field FF, conductor 44 and conductor 25, armature MA and conductor 26 to power lead 16.

The operation of the armature MA of the motor effects a rotation of the blades in a direction and to an extent to adjust the pitch of the propeller for constant speed operation, so that when the governor G is moved to the neutral position for such constant speed operation, the propeller blades 12 have each been moved to the proper position in accordance with the change of load. It will thus be seen that an automatic pitch change in accordance with the load change on the propeller is carried out.

There are, however, additional operating conditions which must be taken into consideration and also additional provisions must be made if the propeller is to be controlled to provide for landing on a short runway or for utilizing the braking effect available in the power plant of the plane if the propeller blades are shifted to a position so that the propellers exert a pushing in place of the normal pulling action.

The reverse quadrant character of operation is under the control of the switch MS which is moved to a position so that the switch arms 38, 39 and 40, respectively, are moved in engagement with the switch contacts 41, 42 and 43, respectively. The automatic constant speed operation for the reverse conditions can then be maintained with the system of the present invention.

If the load on the propeller is such that an increase of speed above that for which the governor G is set occurs, a circuit is set up for operating the propeller blades 12 to accommodate them to this speed as follows: power lead 15, conductor 55, switch arm 54, conductor 60, movable contact 59, resistor R2, conductor 51, switch arm 38, conductor 46, field RF, conductor 44, armature MA, conductor 26 to power lead.

The energization of the field RF will effect a rotation of the armature MA of the motor PM and the movement of the armature MA through the gearing 20, 21 shifts the propeller blades to increase the negative pitch to the desired adjusted position.

If the load on the propeller is such that a decrease of speed below that for which the governor G is set occurs, a circuit is set up as follows: power lead 15, conductor 55, switch arm 54, conductor 60, movable contact 59, resistor R1 conductor 49, switch arm 39, conductor 71, contact member 69, contact strip 29, contact member 70, conductor 72, conductor 45, field FF, conductor 44, conductor 25, armature MA, conductor 26 to power lead 16.

The energization of the field FF permits of the rotation of the motor PM and a shift of the propeller blades 12 to the desired position in accordance with the governor position.

A character of control is also effected with the system of the present invention which prevents the occurrence of any accidents and permits of the proper shifting of the blades if the switch MS is moved to the reverse position while the leading edge of the propeller blade is in its normal forward position for propelling the plane in the customary manner. If the system has been operating with the leading edges of the propeller blades in the normal forward position for propulsion in the forward position and the switch MS is shifted to reverse position, a circuit is provided as follows: power lead 15, conductor 55, switch arm 54, conductor 47, switch arm 40, conductor 76, contact member 73, contact strip 30, contact member 74, conductor 75, conductor 46, field RF, conductor 44 and conductor 25, armature MA and conductor 26 to power lead 16.

The operation of the motor PM moves the blades in the desired direction to place the leading edge of the propeller blade in the reverse quadrant. Slightly before reaching zero, at line 31, contact strip 30 passes from contact with contact members 73 and 74, the governor shunting circuit is interrupted and normal governor-controlled operation in the reverse quadrant is begun.

Similarly also, if the leading edge of the propeller blade has been moved to and is operating in the reverse or rear position, and the switch MS is shifted to the position for forward operation, the governor control is rendered ineffective and a circuit is set up as follows: power lead 15, conductor 55, switch arm 54, conductor 47, switch arm 40, conductor 63, contact member 61, contact strip 27, contact member 62, conductor 64, conductor 45, field FF, conductor 44 and conductor 25, armature MA and conductor 26 to power lead 16.

The operation of the motor PM, under the control of this circuit, moves the blades to zero, whereupon this circuit is interrupted by contact strip 27 passing from contact with contact members 61 and 62. Thereupon the normal governor-controlled circuit moves the blades to a position for normal forward propulsion.

Upon passing the location indicated by the line 31, from either direction, if the governor G has been ineffective because of the position of the control sleeve C, the system will again operate under the control of the governor G.

It will be noted that the use of the brake 22 is such that no shifting actuation of the propeller blades 12 is effected except upon the energization of one of the fields FF or RF to which the release coil of the brake 22 is connected by being interposed in the conductor 44.

The stop 78 which is provided on the control sleeve C at the extreme positions cuts out the circuit leading to one of the respective field windings FF or RF so that the propeller blades 12 will never be moved beyond the limiting position which is determined by the angular location of the stop-operated cutout switches 79 and 80.

Provision is also made for controlling the propeller blades 12 and actuating these blades to a full feathering position independent of the control mechanism heretofore described. This is desirable if one of the engines of a multi-engine installation goes out of commission or with a multi-engine or single engine installation for gliding. If the switch arm 54 of the switch FS is moved into contact with the contact 53, a circuit is set up as follows: power lead 15, conductor 55, switch arm 54, conductor 56, conductor 45, field FF, conductor 44, conductor 25, armature MA and conductor 26 to power lead 16.

The motor PM under the control by this circuit moves the blades to the full feathering position which is limited by the stop 78 and the cutout switch 79.

I claim:

1. In a controllable pitch propeller assembly, blades rotatable about their axes for change of pitch, a governor of adjustable setting responsive to the speed of the propeller, a contact in connection with a source of electrical energy movable by said governor, two contacts adjacent said governor, a reversible electric pitch-changing motor, an electrical connection between each of said two contacts and a field of said motor, a connection from the motor fields to the motor armature and to the said source, switch means controlling said connections operable at the will of the operator to determine whether the pitch change due to the movement of the governor is in the negative or positive range, said connections comprising circuit making and breaking means movable by the blades during change of pitch which shunt the governor-actuated contact and cause said motor, regardless of the position of the governor, to move said blades into the proper range of pitch as determined by the position of the said operator-controlled switch means, whereby the pitch of the blades will be controlled to maintain the speed of the propeller substantially at that desired by the operator in both the positive and negative ranges of change of pitch.

2. In a controllable pitch propeller assembly, blades rotatable about their axes for change of pitch, an adjustable-setting governor responsive to the speed of the propeller, a contact connected to a source of electrical energy movable by said governor, two spaced variable resistances adjacent said governor, one of which is connected with said contact on movement of said governor from its neutral position, a reversible electric motor, an electrical connection from each resistance to a field of said motor, said connections including pilot-controlled switch means and automatic pitch-limiting switch means, a connection from said fields to the motor armature and from the armature to the said source, whereby the speed of the motor in either direction and in the positive or the negative range of pitch is dependent on the amount of change of the speed of the propeller.

3. In a controllable pitch propeller assembly, blades movable for change of pitch, a reversible electric motor connected with the blades for moving the same, a governor responsive to the speed of the propeller, an element connected with a source of electrical energy movable by said governor, two variable resistances, one of which is contacted by said element on movement of said governor in either direction from its neutral position, an electrical connection between each of said contacts and a field of said motor, a connection from the motor fields to the motor armature and to the said source, said connections comprising pitch-limiting switch means actuated with the blades in changing their pitch to break the circuit to the motor when the pitch has been changed a predetermined amount, and electrical means to shunt said governor-actuated element and cause current from said source, at the will of the operator, to actuate said motor and move said blades into fully feathered position.

MILTON R. MULLEN.

CERTIFICATE OF CORRECTION.

Patent No. 2,228,776.  January 14, 1941.

MILTON R. MULLEN.

It is hereby certified that error appears in the above numbered patent requiring correction as follows: In the drawing, Figure 2, lower right-hand corner thereof, strike out the short line connecting conductor 25 to conductor 26; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.